May 8, 1956  B. H. NICOLAISEN  2,744,862
PRODUCTION OF BENZENE HEXACHLORIDE
Filed April 27, 1951
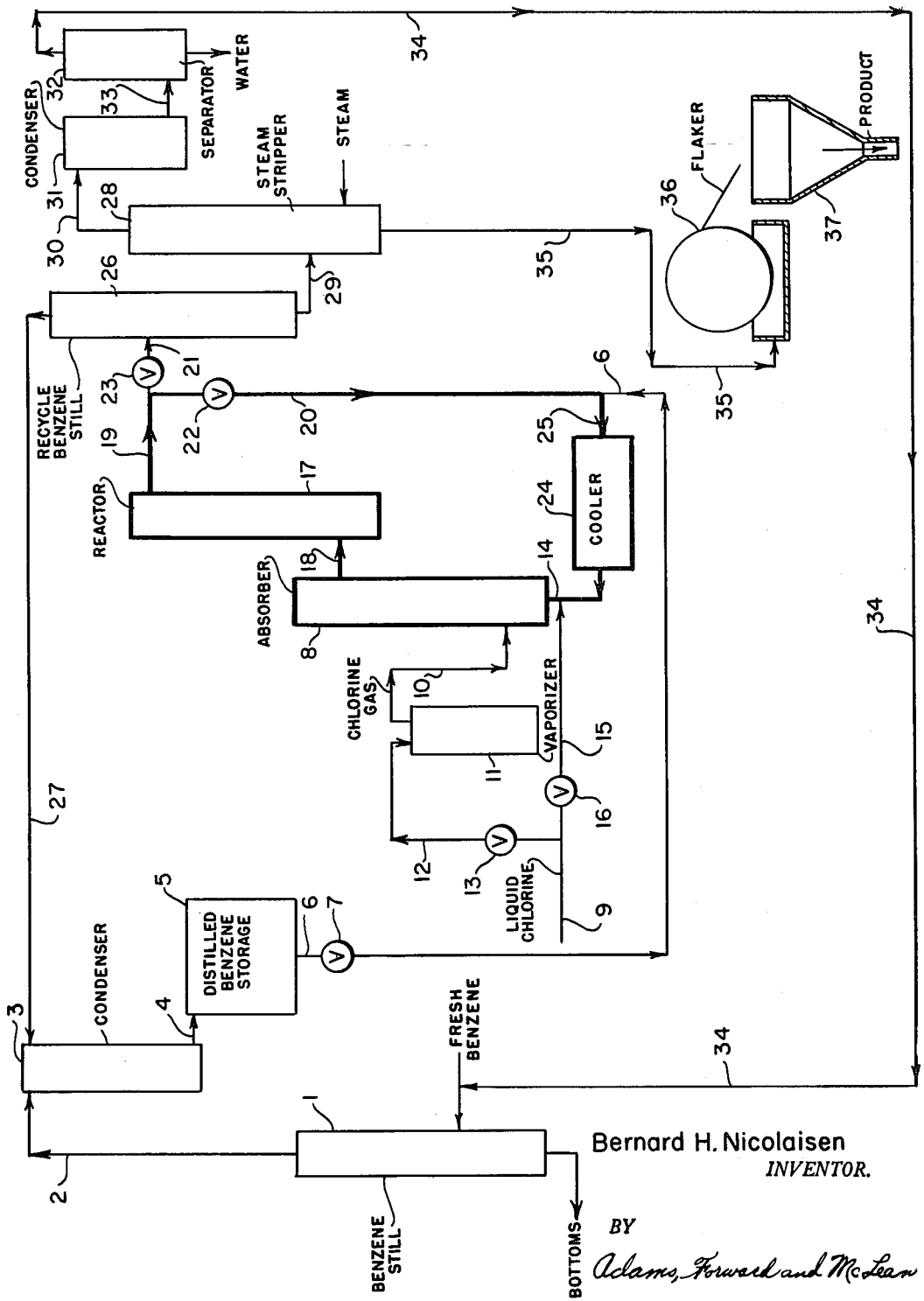
Bernard H. Nicolaisen
*INVENTOR.*
BY
*Adams, Forward and McLean*
ATTORNEYS

United States Patent Office 2,744,862
Patented May 8, 1956

2,744,862
PRODUCTION OF BENZENE HEXACHLORIDE

Bernard H. Nicolaisen, Lewiston, N. Y., assignor to Olin Mathieson Chemical Corporation, a corporation of Virginia Application April 27, 1951, Serial No. 223,255

4 Claims. (Cl. 204—163)

My invention relates to improvements in the production of those isomeric addition products of chlorine and benzene known as benzene hexachloride or hexachlorocyclohexane. More particularly, it relates to a novel cyclic process for the production of benzene hexachloride from benzene and chlorine.

Several methods of producing benzene hexachloride have been proposed. In general, all processes for the production of benzene hexachloride from benzene and chlorine are based on contacting benzene and chlorine under conditions which favor addition of the chlorine to the benzene rather than substitution of the chlorine for the hydrogen of the benzene ring.

In one method of preparing benzene hexachloride, chlorine gas is passed into liquid benzene in a jacketed vessel while coolant is passed through the jacket of the vessel to control reaction temperature. Light, usually of very high intensity, is used to catalyze the addition reaction to form benzene hexachloride. In this simple form, the process is adapted only to batch operation. Thus when sufficient chlorine has been introduced, the flow of chlorine is stopped and the solution is allowed to remain under illumination until all the chlorine has reacted. The solution is then withdrawn and distilled, returning the recovered unreacted benzene to the reactor and obtaining crude benzene hexachloride as a residue. In such a process the initial distribution of catalyzing light is poor and is further diminished as the reaction proceeds due to the formation of solid chlorination products in the solution. As a result, either conversion is low or the rate of conversion is inefficient.

In a typical continuous system, fresh and recycled liquid benzene are introduced with gaseous chlorine into an absorber where the chlorine dissolves without reacting completely. The solution is then passed to a reaction zone or separate reaction chamber where it is illuminated by actinic light to effect complete reaction of the chlorine by addition to the benzene ring. The reacted solution is charged to a still from which unreacted benzene is removed overhead, condensed and returned to the absorbing chamber while the residue is treated to recover the crude benzene hexachloride. This type of operation requires a very large reactor to provide a sufficient heat transfer area so that the temperature in the reactor may be maintained in the proper range and such heat transfer area must be capable of transmitting the catalyzing light. In addition, since the conversion of benzene to benzene hexachloride in this type of continuous system is conventionally about 5 per cent, large amounts of unreacted benzene must be vaporized, condensed and recycled per pound of product. Therefore, the product recovery equipment must be large and the recovery operation requires the addition of a large amount of heat.

I have devised a cyclic process for the production of benzene hexachloride from benzene and chlorine with improved overall efficiency which includes circulating a stream of benzene hexachloride-in-benzene solution between an absorption zone and a reaction zone, regulating the amount of withdrawal to a product recovery zone of benzene hexachloride-in-benzene solution from the stream circulating from the reaction zone, adding make-up benzene to the stream circulating to the absorption zone and regulating the addition of chlorine to the circulating stream in the absorption zone. My cyclic process makes it possible to maintain accurate control of the concentrations of reactants for maximum yields of benzene hexachloride at the best operating conditions for thermal as well as raw material efficiency.

In accordance with my cyclic process, a stream of benzene hexachloride-in-benzene solution is continuously circulated between an absorption zone and a reaction zone. A minor portion of the stream circulating from the reaction zone is withdrawn to a product recovery zone where benzene hexachloride and unreacted benzene are separated. Make-up benzene is added to the stream circulating to the absorption zone to replace the benzene withdrawn to product recovery. Chlorine is introduced into the circulating stream in the absorption zone where it dissolves in the benzene. The chlorine is introduced in an amount sufficient to maintain in the circulating stream leaving the reaction zone a concentration of benzene hexachloride of about 17 to 22 per cent. The circulating stream of benzene hexachloride-in-benzene solution containing the dissolved chlorine passes from the absorption zone to the reaction zone where the circulating stream is subjected to the action of catalyzing light at a temperature maintained below about 70° C. to complete the addition reaction to form benzene hexachloride.

My cyclic process has the advantage that reaction zone temperature is easily controlled. By passing the circulating stream through a cooler placed in the path of the circulating stream between the outlet of the reaction zone and the inlet to the absorption zone and thereby controlling the temperature at which the circulating stream enters the absorption zone, I have been able to obtain effective temperature control within the reaction zone without the use of cooling devices for the reaction vessel. Conventional reactors which are jacketed to provide for the passage of a coolant medium around the reaction vessel are complicated in design and, therefore, costly. However, the use of a cooler for the circulating stream not only provides better temperature control over the reaction but also effects a substantial saving in the cost of process equipment, for a simpler and lower cost reaction vessel can be employed.

I have also found it advantageous to introduce the chlorine into the circulating stream as a liquid to take advantage of the cooling obtained by the vaporization of the chlorine in the circulating stream passing into the absorption zone.

While it might be expected that operating according to my cyclic procedure would tend to increase the amount of substitution products of chlorine and benzene at the expense of benzene hexachloride in product, I have found that this effect, if present at all, is very slight. The amount of substitution products formed in my cyclic process is minimized by limiting the amount of conversion to benzene hexachloride per pass of the circulating stream through the reaction zone. By circulating a stream of benzene hexachloride-in-benzene solution between an absorption zone and a reaction zone and withdrawing a minor portion of the stream circulating from the reaction zone, the concentration of benzene hexachloride in the stream circulating from the reaction zone is maintained in the range of about 17 to 22 per cent by the addition of a small amount of chlorine into the circulating stream in the absorption zone. Actually chlorine introduction into the circulating stream in the absorption zone is limited by operating according to my cyclic process to an amount equal to about 1 to 2 per cent or slightly more of the theoretical amount of chlorine required to convert the total amount of uncombined benzene present in the circulating stream leaving the absorption zone to benzene hexachloride. As a result of operating with this low concentration of chlorine in the large excess of benzene in the circulating stream entering the reaction zone, a short residence time of the circulating stream in the reaction zone, i. e., about 2 to 4 minutes, is sufficient to complete the addition of the chlorine present to benzene. These two factors, low chlorine concentration and short residence time in the reaction zone, seem to favor the addition chlorination of the benzene in preference to any substitution chlorination of the benzene hexachloride.

The thermal efficiency of my process is improved in comparison with prior processes by withdrawing to the product recovery zone from the stream circulating from the reaction zone a product stream which contains a concentration of benzene hexachloride-in-benzene of about 20 per cent. Thus my cyclic operation avoids the necessity of vaporizing and condensing 95 per cent of the benzene charged as has been necessary in prior practice where only 5 per cent conversion has been achieved. Therefore, much smaller equipment will serve to produce a given amount of product or a greater amount of product can be obtained from modified existing equipment operated according to my process. It should be noted, however, that the increased thermal efficiency of my cyclic process is obtained without a sacrifice of yield or product purity, for the desirable low amount of conversion per pass through the reaction zone and a short residence time in the reaction zone are included in my cyclic process.

Operation of my cyclic process will be better understood by reference to the accompanying drawing which is a flow diagram of a suitable embodiment of my cyclic process.

A stream of benzene hexachloride-in-benzene solution is circulated between an absorber 8 and a reactor 17 by means of connecting lines 18, 19, 20, 25 and 14. A minor portion of the circulating stream leaving the reactor 17 is withdrawn from the circulating stream through line 21 and passed to product recovery. Make-up benzene is added to the stream circulating to the absorber 8 through line 6, and chlorine is supplied to the circulating stream in absorber 8 through line 9.

Fresh benzene is charged to a benzene still 1 the overhead from which passes through line 2 to a condenser 3. Liquid benzene passes from the condenser 3 to the distilled benzene storage tank 5 through line 4. The storage tank 5 is placed most conveniently at an elevated location. The distilled benzene is withdrawn from the tank 5 through line 6 in a measured quantity controlled by the valve 7 for introduction into the stream circulating to the absorber 8.

Chlorine is supplied to the process from a liquid chlorine supply through line 9. The chlorine may be introduced into the circulating stream in the absorber 8 in the gaseous state as through line 10 in which case valve 16 is closed and the liquid chlorine is first passed to vaporizer 11 through line 12 at a rate controlled by valve 13 and leaves the vaporizer 11 as chlorine gas through line 10 for introduction into the absorber 8. Alternatively, the chlorine may be introduced into the circulating stream in the absorber 8 as liquid chlorine. In this latter case valve 13 is closed and liquid chlorine is passed into the absorber liquid inlet line 14 through line 15 at a rate controlled by the valve 16. This latter method is advantageous because of the cooling obtained by the vaporization of the liquid chlorine in the circulating stream passing into the absorber 8. While the introduction of liquid chlorine into the circulating stream of benzene hexachloride-in-benzene solution passing into the absorber 8 might be expected to increase the quantity of undesirable substitution products formed, I have found that it produces very little if any actual increase in the amount of substitution products.

The circulating stream of benzene hexachloride-in-benzene solution containing the dissolved chlorine passes from the absorber 8 to the bottom of an illuminated reactor 17 through line 18 where the addition reaction to form benzene hexachloride is completed. The circulating stream leaves the top of the reactor 17 through line 19, and by the operation of the valves 22 and 23 in lines 20 and 21, a portion of the circulating stream is withdrawn through line 21 in amount controlled by valve 23 and passed to benzene hexachloride recovery equipment while the circulating stream passes to the absorber 8 through line 20 in amount controlled by valve 22. A cooler 24, which may be of any suitable type, is placed in the path of the circulating stream to reduce the temperature of the circulating stream passing to the absorber 8 and thereby control the temperature of the subsequent reaction in the reactor 17. Circulating stream in line 20 and the distilled benzene from line 6 enter the cooler 24 through cooler inlet 25 and pass from the cooler 24 to the absorber 8 through line 14.

The portion of the benzene hexachloride-in-benzene solution withdrawn from the circulating stream through line 21 passes to the recycle benzene still 26 where the major portion of the benzene of the benzene hexachloride-in-benzene solution is removed. The overhead leaves the recycle benzene still 26 through line 27 and is condensed in the condenser 3 and passes to storage tank 5 for eventual return to the circulating stream as make-up benzene. The crude product obtained as bottoms from recycle benzene still 26 is charged to the steam stripper 28 through line 29 where residual benzene is steam distilled. The overhead leaves the steam stripper 28 through line 30 and is condensed in condenser 31. The condensate from condenser 31 is passed through line 33 to the separator 32 where the condensate is separated into a benzene layer and a water layer. The benzene layer is recycled to the benzene still 1 through line 34. The bottoms from steam stripper 28, which comprise the benzene hexachloride product, leave the stripper 28 through line 35 and flow to flaker 36 where the product is converted to desirable form and collected in the storage hopper 37.

In the operation of my cyclic process described above, there are certain variable factors which are advantageously retained within ranges which I have found to give the most efficient operating results.

The temperature throughout the addition reaction between the chlorine and benzene should be maintained below a temperature of about 70° C., and preferably below about 60° C., in order to avoid the formation of substitution products, the formation of which is favored with elevated temperature. Since the addition reaction between chlorine and benzene to form benzene hexachloride is an exothermic one, the temperature of the circulating stream entering the absorber should be maintained at such a temperature that the temperature of the reaction mix will not exceed about 70° C. Therefore, absorber inlet temperature is advantageously maintained at about 30° C. although higher temperatures in the absorber inlet are allowable, e. g., 40°-45° C., the temperature of the circulating stream in the reactor being the real consideration. However, the use of higher absorber inlet temperatures will probably require the use of a coolant in the jacket of a jacketed reactor or some other means for cooling the solution in the reaction vessel, whereas maintaining the absorber inlet temperature at a lower value will make the cooling of the reaction vessel unnecessary. The use of a cooler for the circulating stream passing to the absorber makes it possible to regulate the temperature of the circulating stream entering the absorber and thereby the temperature in the reactor.

The percentage of the circulating stream leaving the reactor which is withdrawn to product recovery may vary within quite a wide range. The actual percentage withdrawn in any particular operation of my cyclic process will depend on the concentration of benzene hexachloride to be maintained in the circulating stream which in turn will determine the rate of chlorine introduction into the circulating stream in the absorber. In addition, the amount of cooling required for the reaction mix and the temperature of the coolant available for the cooler will affect the quantity of the circulating stream which must pass through the cooler. The concentration of benzene hexachloride in the circulating stream leaving the reactor is maintained with advantage within the range of about 17 per cent to 22 per cent, although somewhat higher and lower concentrations can be established and maintained in the circulating stream with good results. In general, therefore, the percentage of the circulating stream withdrawn from the stream circulating from the reactor and passed to benzene hexachloride product recovery may vary from a maximum of about 50 per cent, when the rate of chlorine introduction is slightly higher than 2 per cent of the amount required to convert the uncombined benzene in the circulating stream leaving the absorber to benzene hexachloride and the concentration of the benzene hexachloride in the circulating stream leaving the reactor is slightly below 17 per cent, to a minimum of about 15 per cent, when the rate of chlorine introduction is about 1 per cent and the benzene hexachloride concentration about 22 per cent.

The following example will further illustrate my cyclic process.

Liquid chlorine was vaporized and introduced into the circulating stream in the absorber at the rate of 2100 parts per hour. Make-up benzene was introduced from the storage tank into the stream circulating to the absorber at the rate of 11,400 parts per hour. This total amount of make-up benzene was obtained both from the recycle benzene still and the fresh benzene still, i. e., 10,430 parts per hour were returned to the storage tank from the recycle benzene still, while 970 parts per hour were added to the storage tank from the fresh benzene still with a small amount of the 970 parts being obtained from the benzene recovered in the steam distillation of the crude benzene hexachloride product. The circulating stream of benzene hexachloride-in-benzene solution circulated from the reactor to the absorber at the rate of 70,000 parts per hour. The effluent from the absorber, i. e., 83,500 parts per hour at a temperature of about 44° C., passed upward through the reactor and overflowed in a stream having a temperature of about 70° C. The circulating stream leaving the reactor contained about 20 per cent benzene hexachloride. A stream of 13,500 parts per hour was withdrawn from the circulating stream leaving the reactor and charged to the recycle benzene still and subsequent recovery equipment. The remaining 70,000 parts per hour of the circulating stream passed through a cooler and entered the absorber at a temperature of about 42.5° C. The overhead benzene from the recycle benzene still was returned through a condenser to the storage tank. The bottoms from the recycle benzene still comprising a product consisting of about 92 per cent benzene hexachloride were charged at a temperature of about 130° C. to the steam stripper from which benzene hexachloride was removed as bottoms at a temperature of about 150° C. The bottoms from the stripper were passed to a flaker and the product recovered amounted to about 2780 parts per hour of benzene hexachloride representing a yield of about 97 per cent on the chlorine charged to the absorber.

Unless otherwise specified, all percentages and parts included in the description of my cyclic process are by weight.

I claim:

1. A cyclic process for the production of benzene hexachloride from benzene and chlorine by reaction at a temperature of less than about 70° C. and in the presence of catalyzing light which comprises circulating a liquid stream consisting of benzene hexachloride-in-benzene solution between an absorption zone and a reaction zone, withdrawing to a product recovery zone a minor portion of the stream circulating from the reaction zone, adding make-up benzene to the stream circulating to the absorption zone, adding chlorine to the circulating stream in the absorption zone in an amount equal to about 1 to slightly more than 2% of the theoretical amount of chlorine required to convert the total amount of uncombined benzene present in the circulating stream leaving the absorption zone to benzene hexachloride and sufficient to maintain a concentration of benzene hexachloride of about 17 to 22 per cent in the circulating stream leaving the reaction zone, and recovering benzene hexachloride from the benzene hexachloride-in-benzene solution in the product recovery zone.

2. A cyclic process for the production of benzene hexachloride from benzene and chlorine by reaction at a temperature of less than about 70° C. and in the presence of catalyzing light which comprises circulating a liquid stream consisting of benzene hexachloride-in-benzene solution between an absorption zone and a reaction zone, withdrawing to a product recovery zone a minor portion of the stream circulating from the reaction zone, adding make-up benzene to the stream circulating to the absorption zone, cooling the stream circulating to the absorption zone, adding chlorine to the circulating stream in the absorption zone in an amount equal to about 1 to slightly more than 2% of the theoretical amount of chlorine required to convert the total amount of uncombined benzene present in the circulating stream leaving the absorption zone to benzene hexachloride and sufficient to maintain a concentration of benzene hexachloride of about 17 to 22 per cent in the circulating stream leaving the reaction zone, and recovering benzene hexachloride from the benzene hexachloride-in-benzene solution in the product recovery zone.

3. A cyclic process for the production of benzene hexachloride from benzene and chlorine by reaction at a temperature of less than about 70° C. and in the presence of catalyzing light which comprises circulating a liquid stream consisting of benzene hexachloride-in-benzene solution between an absorption zone and a reaction zone, withdrawing to a product recovery zone a minor portion of the stream circulating from the reaction zone, adding make-up benzene to the stream circulating to the absorption zone, cooling the stream circulating to the absorption zone, adding liquid chlorine to the circulating stream in the absorption zone in an amount equal to about 1 to slightly more than 2% of the theoretical amount of chlorine required to convert the total amount of uncombined benzene present in the circulating stream leaving the absorption zone to benzene hexachloride and sufficient to maintain a concentration of benzene hexachloride of about 17 to 22 per cent in the circulating stream leaving the reaction zone, and recovering benzene hexachloride from the benzene hexachloride-in-benzene solution in the product recovery zone.

4. A cyclic process for the production of benzene hexachloride from benzene and chlorine by reaction at a temperature of less than about 70° C. and in the presence of catalyzing light which comprises circulating a liquid stream consisting of benzene hexachloride-in-benzene solution between an absorption zone and a reaction zone, withdrawing to a product recovery zone a minor portion of the stream circulating from the reaction zone, adding make-up benzene to the stream circulating to the absorption zone, adding chlorine to the circulating stream in the absorption zone in an amount equal to about 1 to slightly more than 2% of the theoretical amount of chlorine required to convert the total amount of uncombined benzene present in the circulating stream leaving the absorption zone to benzene hexachloride and sufficient to maintain a concentration of benzene hexachloride of about 17 to 22 per cent in the circulating stream leaving the reaction zone, recovering benzene hexachloride from the benzene hexachloride-in-benzene solution in the product recovery zone and returning to the stream circulating to the absorption zone unreacted benzene separated from the benzene hexachloride-in-benzene solution in the product recovery zone.

References Cited in the file of this patent

UNITED STATES PATENTS

| | | |
|---|---|---|
| 2,499,120 | Stormon | Feb. 28, 1950 |
| 2,529,803 | Gonze | Nov. 14, 1950 |
| 2,530,699 | Humphrey et al. | Nov. 21, 1950 |
| 2,552,562 | Kauer et al. | May 25, 1951 |
| 2,569,677 | La Lande et al. | Oct. 2, 1951 |
| 2,622,105 | Miller et al. | Dec. 16, 1952 |

FOREIGN PATENTS

| | | |
|---|---|---|
| 504,569 | Great Britain | Apr. 26, 1939 |

OTHER REFERENCES

Chemical Abstracts, vol. 41 (1947), p. 4111, article by Bezobrazov et al.